May 19, 1953      A. C. COPE      2,639,342
LOW TIRE INDICATOR
Filed Nov. 14, 1950
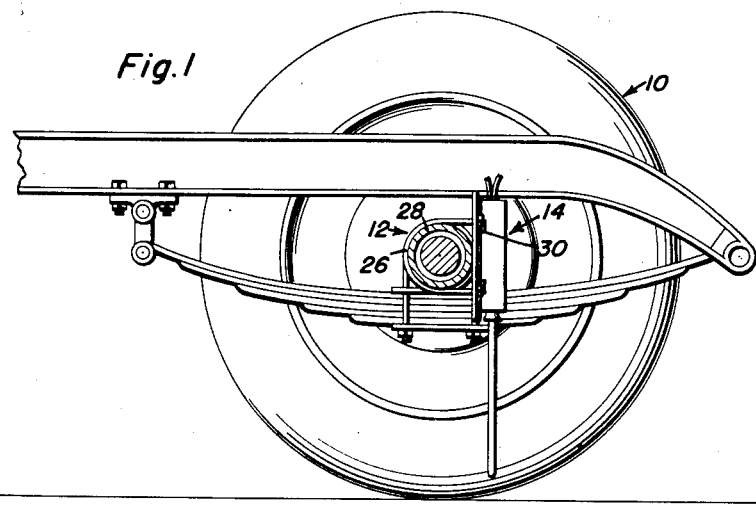
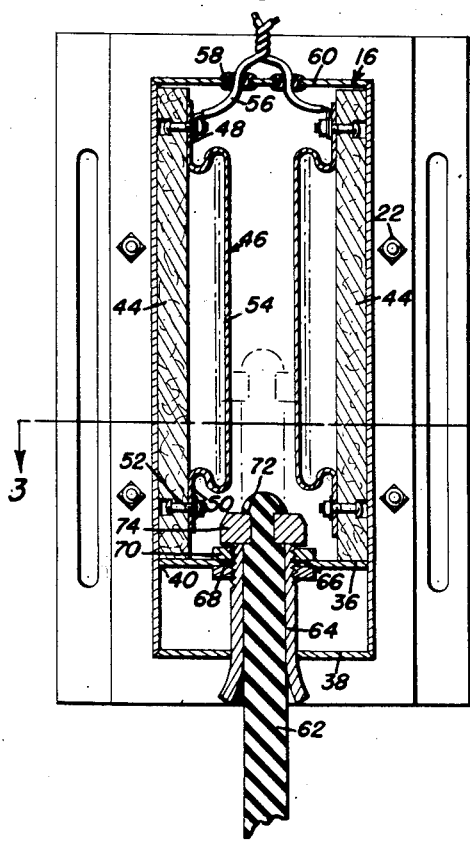
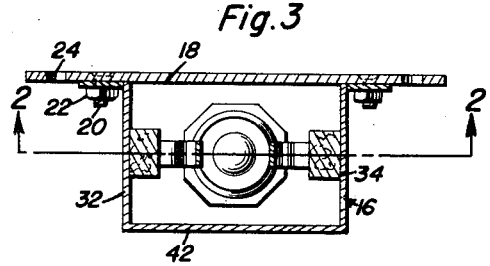
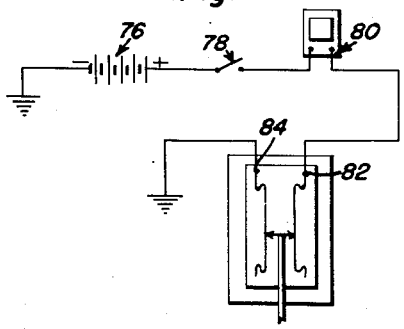
Archie C. Cope
INVENTOR.
BY *Clarence A. O'Brien*
*and Harvey B. Jackson*
Attorneys Patented May 19, 1953

2,639,342

UNITED STATES PATENT OFFICE 2,639,342

LOW TIRE INDICATOR

Archie C. Cope, Ashland, Ky.

Application November 14, 1950, Serial No. 195,671

2 Claims. (Cl. 200—58)

The present invention relates to improvements in low tire indicating devices whereby, when a vehicle tire becomes substantially deflated, the mechanism is automatically actuated to sound a buzzer alarm, or the like.

An object of the present invention is to provide a device which is responsive to downward movement of the axle when the pressure in the tire becomes lowered, whereby a switch is closed in a circuit, activating an alarm buzzer.

Another object of the present invention is to provide a structure having a flexible contact plunger which is engageable with the surface supporting the wheel, whereby, when the pressure in the tire reaches a predetermined point, the flexible plunger will be displaced vertically for closing a switch in an electrical buzzer circuit.

A further object of the present invention is to provide an automatically actuated indicating device for indicating a low pressure in the tire, wherein the plunger for closing the switch may automatically open the switch upon supplying the tire with the desired pressure.

Still another object of the present invention is to provide an indicating device which is simple in construction, economical of manufacture, readily attached on the axle of an automotive vehicle and readily detached therefrom.

Various other objects and advantages will become apparent from the detailed description to follow. The best form in which I have contemplated applying my invention is clearly illustrated in the accompanying drawings, wherein:

Figure 1 is a side elevational view showing the indicating device mounted on the rear axle of an automobile;

Figure 2 is a vertical transverse sectional view taken substantially along the plane of line 2—2 of Figure 3;

Figure 3 is a horizontal transverse sectional view taken substantially along the plane of line 3—3 of Figure 2; and Figure 4 is a circuit diagram employed in the present invention.

Referring more particularly to the drawings, wherein like numerals designate like parts throughout, the numeral 10 designates generally the rear tire of an automobile, the numeral 12 designates generally the rear axle mounting the tire 10, and the numeral 14 designates generally the indicating device of the present invention.

The indicating device 14 is comprised of a substantially rectangular hollow housing 16 which is removably secured to a plate 18 forming a back wall for the hollow housing 16, by means of a plurality of screws 20 and nuts 22. The plate 18 is provided with an elongated slot 24 on each side of the housing 16. A plurality of U-bolts 26 are disposed over the axle housing 28 and have their ends disposed in the slots 24 and secured in adjusted position by means of the nuts 30.

The housing 16 has its side walls 32 and 34 connected by a plate 36 which is in spaced relation to the bottom wall 38. Weld at 40, or other means, may be employed for securing the wall 36 to the side walls 32 and 34 and the front wall 42. Abutting each of the side walls 32 and 34 are a pair of insulating elements in the form of elongated strips 44. Each of the insulating strips 44 is provided with a spring contact element 46 which has its offset ends 48 and 50 secured to the insulating strip 44 by means of screws 52. The contacting portions 54 of the elements 46 are disposed in spaced relation and are parallel to each other. The upper ends of the contact elements 46 have electrical conductor wires 56 connected thereto and extending out through insulating bushings 58 formed in the upper wall 60.

A resilient, rubber-like plunger 62 is reciprocably disposed in the housing 16, as will presently be described. A flared tube 64 is vertically disposed through the bottom wall 38 and has its upper end externally threaded and positioned within the aperture 66 in the plate 36. A pair of nuts 68 and 70 are disposed on either side of the plate 36 and engage the threaded end of the flared tube 64 for securely positioning the same within the housing. The upper end of the flexible plunger 62 is formed with an annular groove 72 in which is disposed an annular conductor element 74.

Looking now at the circuit diagram in Figure 4, it will be seen that a battery 76 has one lead connected to ground and the other lead connected to the ignition switch 78. The conductor leading from the ignition switch 78 is connected in series with the buzzer 80 and the first contact 82 and second contact 84, the second contact 84 being connected to ground.

In operation, the device is normally in the position shown in Figure 1, with the lower end of the flexible plunger 62 in spaced relation to the supporting surface for the wheel. As the pressure in the tire decreases to a predetermined amount, the plunger 62 engages the supporting surface and is vertically displaced to a position between the elements 46, as shown by the dotted lines in Figure 2. The circuit between the first and second contact points 82 and 84 is completed by means of the conductor ring 74, thereby actuating the buzzer 80 and apprising the driver of the vehicle of the fact that the pressure in one of the tires has become low.

In view of the foregoing description, taken in conjunction with the drawings, it is believed that a device has been provided which will accomplish all of the objects hereinabove set forth.

Having described the invention, what is claimed as new is:

1. An indicating device comprising a housing including a vertically extending back plate, a hollow member detachably secured to said back plate, said back plate having spaced slots adjacent opposite edges thereof whereby the housing may be adjustably secured to the axle of a wheel, a pair of contacts disposed in vertically disposed, parallel spaced relation within said housing, a resilient plunger vertically disposed and reciprocably mounted in said housing with a lower end portion adapted to engage the surface supporting the wheel upon a predetermined decrease in the pressure within the tire on the wheel, the upper end of said plunger being adapted to be vertically displaced to a position between said contacts, and means on said plunger providing an electrical connection when disposed between said contacts, said plunger being formed of a rubber-like material, said means including a conductor ring disposed around the upper end of said plunger.

2. An indicating device comprising a housing including a vertically extending back plate, a hollow member detachably secured to said back plate, said back plate having spaced slots adjacent opposite edges thereof whereby the housing may be adjustably secured to the axle of a wheel, a pair of flexible contacts disposed in vertically disposed, parallel spaced relation within said housing, a resilient plunger vertically disposed and reciprocably mounted in said housing with a lower end portion adapted to engage the surface supporting the wheel upon a predetermined decrease in the pressure within the tire on the wheel, the upper end of said plunger being adapted to be vertically axially displaced to a position between said contacts, and means on said plunger providing an electrical connection between said contacts, said housing being provided with a flared downwardly extending tube in which said plunger is reciprocably slidably mounted.

ARCHIE C. COPE.

References Cited in the file of this patent

UNITED STATES PATENTS

| Number | Name | Date |
|---|---|---|
| 1,638,983 | Crone | Aug. 16, 1927 |
| 1,775,629 | Bone | Sept. 16, 1930 |
| 2,442,956 | Meroney | June 8, 1948 |